United States Patent [19]

Pearson et al.

[11] Patent Number: 5,411,259
[45] Date of Patent: May 2, 1995

[54] VIDEO SPORTS GAME SYSTEM USING TRADING CARDS

[75] Inventors: Carl P. Pearson, Edmonds; David W. Hood, Seattle, both of Wash.

[73] Assignee: Hero, Inc., Seattle, Wash.

[21] Appl. No.: 984,304

[22] Filed: Nov. 23, 1992

[51] Int. Cl.⁶ ................................................ A63F 9/22
[52] U.S. Cl. .................................... 273/93 C; 273/434
[58] Field of Search ................ 273/85 G, 88, 237, 434, 273/438, 93 C

[56] References Cited

U.S. PATENT DOCUMENTS

| | | | |
|---|---|---|---|
| 4,840,302 | 6/1989 | Rubin | 273/237 |
| 4,861,031 | 8/1989 | Simms | 273/85 G |
| 4,958,837 | 9/1990 | Russell | 273/237 |
| 5,026,058 | 6/1991 | Bromley | 273/88 |
| 5,067,079 | 11/1991 | Smith, III et al. | 273/85 G |
| 5,190,285 | 3/1993 | Levy et al. | 273/85 G |

*Primary Examiner*—Jessica J. Harrison
*Attorney, Agent, or Firm*—Jensen & Puntigam

[57] ABSTRACT

The system includes a control system (12) which carries out the performance of a video sports game, such as a baseball game, and controls the display on a video monitor (14). Input information concerning the performance of players in the game is supplied via trading card elements (20—20), each of the trading card elements having a conventional trading card appearance which includes a photograph of the player and performance data in human-readable form. The trading card element (20) also includes machine-readable performance information (input data) which is readable by a card reader (22) which applies the input data on the card to the control system (12), which then creates the two teams and carries out the game.

8 Claims, 2 Drawing Sheets

VIDEO SPORTS GAME SYSTEM USING TRADING CARDS

TECHNICAL FIELD

This invention relates generally to a video game system, and more specifically concerns a video game system using a particular type of input medium.

BACKGROUND OF THE INVENTION

Software-based video games of varying sophistication are, of course, well known in the home entertainment industry. Within this general field, there exists games which are directed toward sports, such as, for instance, baseball, football and soccer, among others, as well as other types of interactive games (police/criminal chase games, etc.). In order to achieve as much reality as possible, the software for sports games, for instance, will use performance data, typically actual statistics for active or retired players, to produce a realistic game situation. Examples of such a software-controlled sports video game for baseball include Extra Innings, Super Bases Loaded and BaseWars for Nintendo systems (the software produced by Sony Imagesoft, Jaleco and Ultragames, respectively), as well as R.B.I. Baseball 3 for the Sega Genesis system (the software produced by Tegen). There are other software controlled video games for baseball as well as many other sports. The software necessary to control a game using performance data is thus well known.

In addition, it is known in such systems to have sufficient data in memory concerning individual players (e.g. the baseball players used in the game) that the that the players (users) of the video game can select a lineup of their choosing from a list of players. However, the selection which is available with current games is often quite limited relative to the large number of players for whom performance data has in fact been accumulated.

In an unrelated line of development, sports trading cards are well known, particularly in such sports as baseball and football, but also in other sports as well, and occasionally in some other fields, i.e. the so-called "famous criminals" cards. Such trading cards typically have a large photograph of the player on one side and performance statistics on the other side. Such cards are used only for collecting, sale and trading, however.

SUMMARY OF THE INVENTION

Accordingly, the invention is a video game system which comprises: an electronic game system which includes a video monitor for display of a video game, wherein the players in the video game are representative of actual people; software control means for carrying out a video game and controlling the display on the monitor in accordance with a software program stored therein and in accordance with certain input data supplied by trading card elements; card reader means connected to and supplying input data to said software control means, in response to trading card elements being selectively played therein; and trading card elements having input data stored thereon concerning performance information of said players, said input data being in a form which is readable by said card reader means.

Alternatively, the input data on the card elements could be access data which is used to access performance information for the player represented by the card element stored in the control means.

BEST MODE FOR CARRYING OUT THE INVENTION

Figure 1:
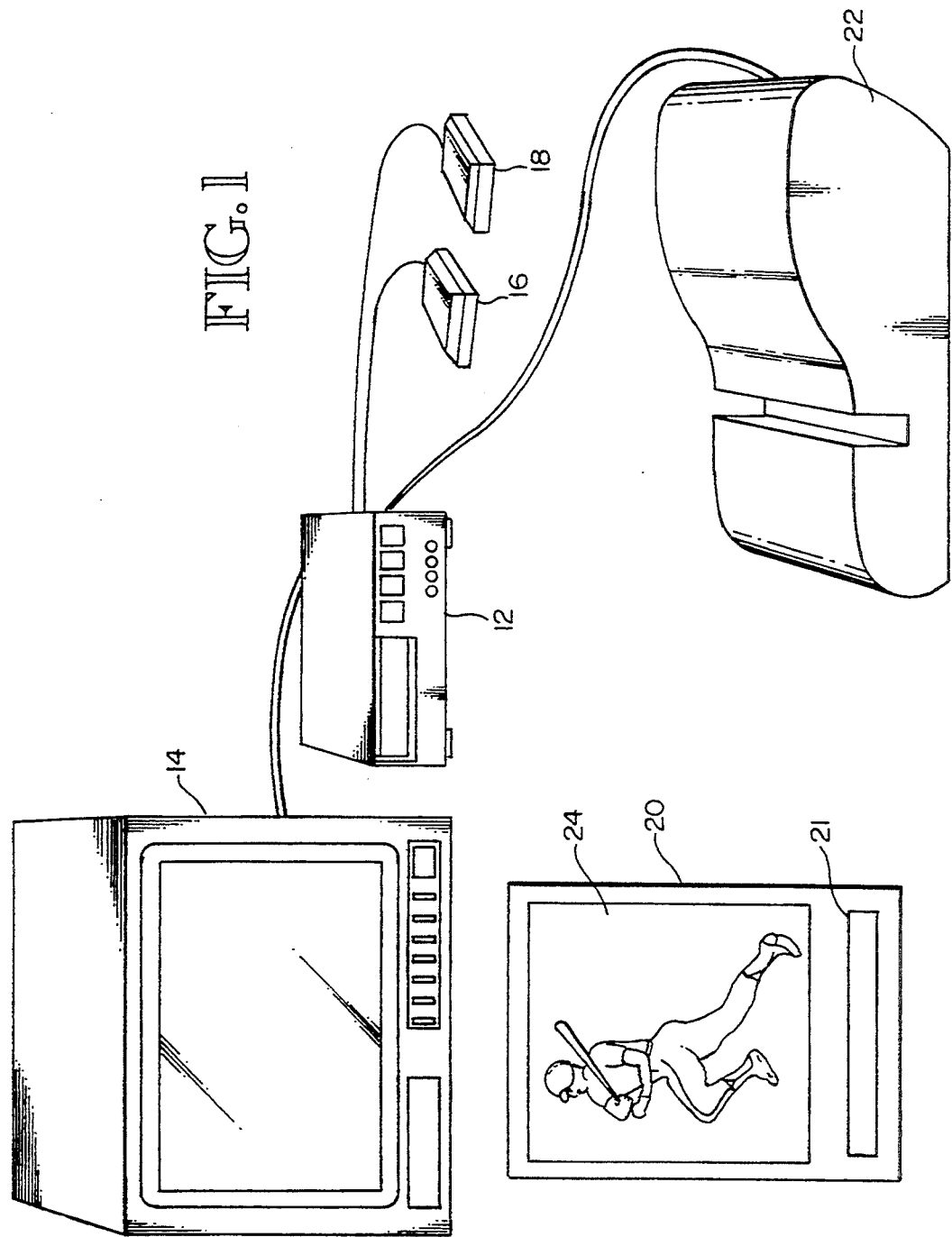
FIG. 1 is a block diagram showing the system of the present invention.

FIG. 1 shows in block diagram form the system of the present invention, referred to generally at 10. The system includes a software-based control system 12 which carries out, i.e. controls, the playing of the game, including the display thereof. The control system 12 is not disclosed in detail herein because it is conventional, i.e. such systems for carrying out a sports or other video game are well known, as indicated above. Some examples of such a baseball video game are provided above. Many other examples for baseball and other sports are readily available. The control system 12 controls the generation of the display of the game as it progresses on a monitor 14, which can, for instance, be a conventional TV monitor. In operation, images of the players (i.e. the baseball players in a video baseball game) will be displayed on the monitor, as well as the actual sequence of actions as the game is played, all produced under the control of control system 12.

Any interaction of the video game players (the users of the video game) with control system 12 to affect the game is accomplished through separate control elements 16 and 18. In a baseball game, for instance, this form of additional control might be used to affect the game being played in the areas of pitching, hitting, fielding and running the bases.

The key part of the system of the present invention is the player input data which is supplied to the control system 12, and more specifically, the particular medium on which the input data is stored. For the example of a baseball game, statistical performance data, such as batting average, etc., for the players which will comprise each of the teams is supplied to the control system 12 on a card element 20. The card element 20 will have located thereon all of the desired performance data in machine-readable form, such as bar code, magnetic, optical, or other form. However, it should be understood that the present invention is not limited to a particular type of data format. In the embodiment shown, the data is shown in a region 21 on one side of the card. Alternatively, performance data for a large number of players could be stored in memory in control system 12, with card element 20 having a correlating access number for the player on the card for the stored data.

The card element 20 simultaneously functions as a trading card, i.e., it is otherwise similar to a conventional sports trading card in all respects. Thus, it has a picture 24 of a known player of the game, such as a current or past major league baseball player on one side, and their performance statistics printed in human-readable form on the other side, similar to existing trading cards. These card elements can be purchased, sold, traded, collected and otherwise used like conventional sports trading cards. Thus, the user can, through purchase of cards in local outlets or stores or by mail order or some other means, accumulate a large collection of trading cards which can be traded as well as be used as input media in the sports video game of the present invention. The cards 20 used with the present invention thus, in effect, have an independent, separate utility as trading cards and as an input medium; i.e., they can be used as trading cards and/or also can be used in the video system of the present invention.

Use of trading cards as an input medium permits the video game user to accumulate a large number of potential players for his team while being able to also use the cards as conventional trading cards.

It should be understood that the input cards, such as for the example of baseball, could include past players ("old-timers") as well as current players. Also, there could be cards for managers and umpires, as well as cards containing specialized input information concerning field and weather conditions and other factors which could influence the game, including "injury" cards, which could be used against key players on the other side. Further, it should be understood that while the game will typically be played with two individual game users, the system may also be used with a single user.

In actual use of the system, the input information on cards 20-20, which could be performance data, an access code to data stored in the control system memory or a combination of both, is scanned by the remaining element of the system 10, a conventional card reader 22 which is shown somewhat schematically and which is designed to read the input information present in area 21 of the card. The card reader 22 supplies the information which it has read to control system 12, and the game then is carried out by the control system as display 14.

Figure 2:
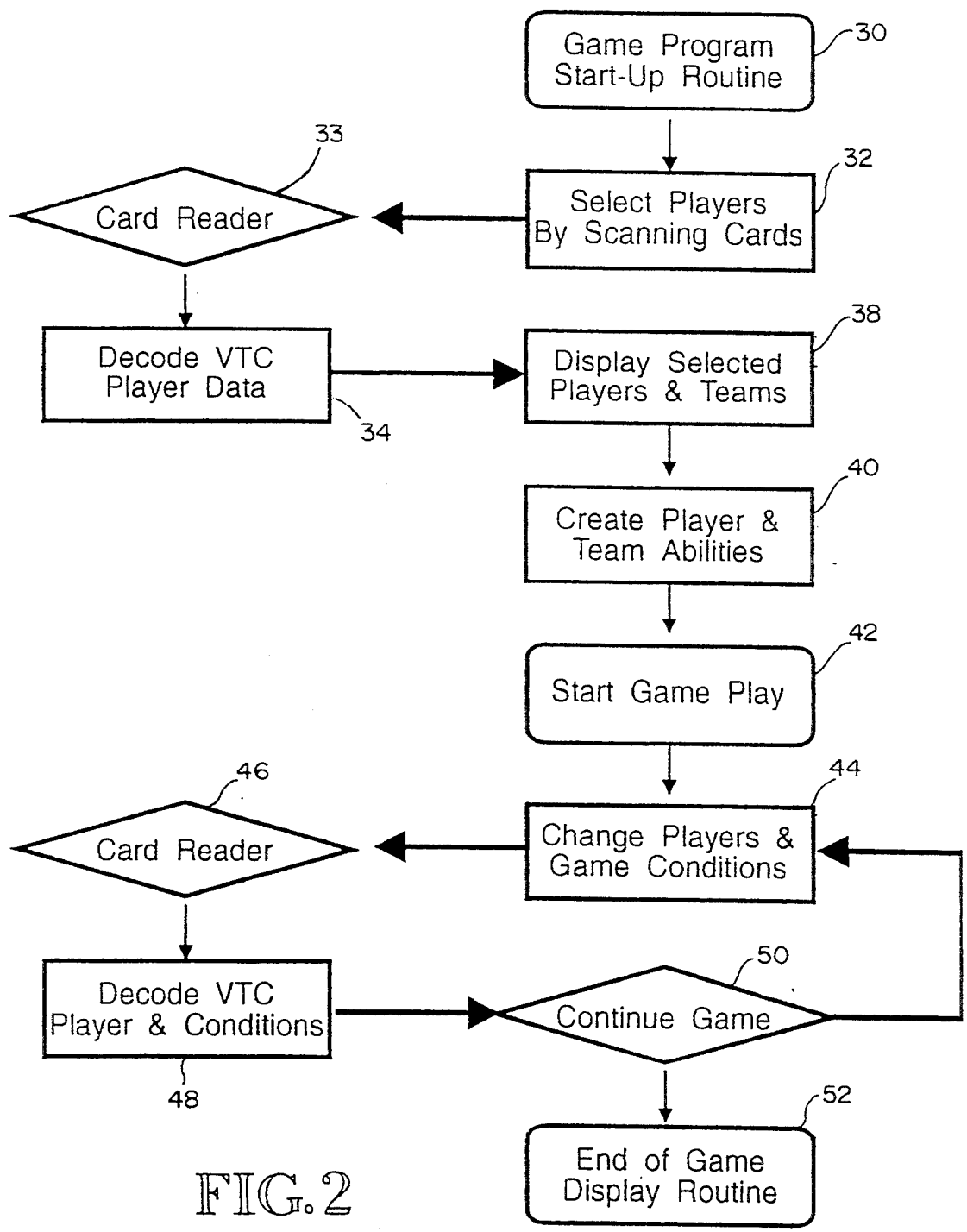
FIG. 2 is a flow chart showing the sequence of operations of the system of FIG. 1.

FIG. 2 shows in simplified form the operation of the system of the present invention. Initially, control system 12 is activated and the software progresses through its normal start-up routine, shown at block 30. Then, each game user selects the players for the game (the "lineup") from their collection of cards, as shown at block 32. The game users will then insert the individual card elements 20-20 into the card reader 22, shown at block 33, which will then decode the performance data on the card (or the access code to the data in the control system 12), as shown at block 34. The individually selected players will then be displayed, as well as the complete teams comprised of the selected players, as shown at block 38. The performance data will then be applied to the control system, which integrates the player information into the game system, as shown at block 40. The game will then commence under the control of the control system 12, and any interactive control by the two video game users, as shown at block 42.

At any point during the playing of the game, the video game user can substitute additional cards to change the lineup and hence the game, as shown in block 44. Other changes can be made with other input cards, such as for field and weather conditions, injuries, etc. These additional input cards are also applied to the card reader 22 by the video game user, as shown at block 46, which decodes them and applies the information thereon to the control system 12, thus in effect changing to some extent the game, as shown at block 48. The game then continues, at block 50, with players and conditions being changeable until the end of the game occurs, shown at block 52

The present invention can be used in a wide variety of video sports games, as trading cards for each sport become available. Also, as discussed above, many of the conditions affecting the output of a game can be altered/controlled within the system of the present invention, in addition to controlling which players are to be part of a particular game. Baseball, football and soccer, as well as other games, are hence very suitable for use in the present invention. Other games in addition to sports, involving competition between two (or more) teams or entities, are possible.

Hence, a preferred embodiment of the invention has been disclosed herein. It should be understood, however, that various modifications and substitutions may be incorporated in the embodiment, without departing from the spirit of the invention, which is defined by the claims which follow:

What is claimed is:

1. A video game system, comprising:
   an electronic game system for use with a video monitor for displaying the playing of a video game, wherein the players in the video game are representative of actual people with known performance information;
   software control means for carrying out a video game and controlling the display on the monitor in accordance with a software program stored in said software control means and in accordance with certain selected input data for the players in the video game supplied by trading card elements and certain additional input data for said players which is stored in a separate system memory means and accessed by access indicia on said trading card elements, Wherein the access indicia on each trading card accesses additional input data for the player featured on the trading card;
   means for obtaining for said software control means said additional input data, which includes performance information, from said system memory means;
   card reader means supplying said selected input data and said access indicia to said software control means, in response to the trading card elements being selectively placed therein; and
   trading card elements having stored thereon said selected input data concerning performance information of said players and said access indicia, wherein said selected input data and said access indicia are readable by said card reader means.

2. A system of claim 1, wherein the trading card elements include card elements having input data affecting the play of the game other than player performance information.

3. A system of claim 1, wherein the video game is a sports game and wherein the players are well-known figures in that game.

4. A system of claim 3, wherein the trading card elements include a photograph of the player and human-readable performance information thereon, substantially identical to existing sports trading cards.

5. A system of claim 3, wherein the sports video game is baseball.

6. A system of claim 1, wherein the control means is responsive to a change in the players during playing of the game to alter the playing of the game accordingly.

7. A system of claim 1, wherein the video monitor is a television screen.

8. A system of claim 1, wherein the additional input data includes information which affects the play of the game other than player performance information.

* * * * *